United States Patent

Egashira et al.

[11] Patent Number: 5,605,968
[45] Date of Patent: Feb. 25, 1997

[54] GOLF BALL

[75] Inventors: Yoshinori Egashira, Hidaka; Hisashi Yamagishi, Yokohama; Hideo Watanabe, Yokohama; Jun Shindo, Yokohama, all of Japan

[73] Assignee: Bridgestone Sports, Co., Ltd., Tokyo, Japan

[21] Appl. No.: 447,044

[22] Filed: May 22, 1995

Related U.S. Application Data

[63] Continuation-in-part of Ser. No. 213,587, Mar. 16, 1994, abandoned.

[30] Foreign Application Priority Data

Mar. 17, 1993 [JP] Japan ................ 5-082714

[51] Int. Cl.$^6$ .......... A63B 37/12; A63B 37/06; C08L 23/08; C08L 33/02
[52] U.S. Cl. .......... 525/221; 525/196; 525/195; 524/908; 473/385; 473/367; 473/372
[58] Field of Search ............ 525/195, 196, 525/221; 524/908; 273/235 R, 230; 473/385, 367, 372

[56] References Cited

U.S. PATENT DOCUMENTS

| 4,801,649 | 1/1989 | Statz | 525/221 |
| 4,884,814 | 12/1989 | Sullivan | 525/221 |
| 5,120,791 | 6/1992 | Sullivan et al. | 525/221 |
| 5,252,652 | 10/1993 | Egashira et al. | 524/908 |
| 5,324,783 | 6/1994 | Sullivan | 525/221 |
| 5,328,959 | 7/1994 | Sullivan | 525/221 |

FOREIGN PATENT DOCUMENTS 2297384 12/1990 Japan.

*Primary Examiner*—Carman J. Seccuro, Jr.
*Attorney, Agent, or Firm*—Sughrue, Mion, Zinn, Macpeak & Seas

[57] ABSTRACT

A solid golf ball includes a solid core enclosed in a cover. The resin component of the cover consists of 30 to 100% by weight of an ethylene-methacrylic acid-acrylate terpolymer ionomer resin having a flexural modulus of 2,500–14,000 psi and a Shore D hardness of 20–59 and 70 to 0% by weight of an ethylene-(meth)acrylic acid copolymer ionomer resin having a flexural modulus of 20,000–29,000 psi and a Shore D hardness of 56–62. The ball is excellent in spin receptivity, burring resistance, and feel on hitting.

3 Claims, No Drawings

GOLF BALL

CROSS REFERENCE TO RELATED APPLICATION

This application is a continuation-in-part of application Ser. No. 08/213,587 filed on Mar. 16, 1994, now abandoned the entire contents of which are hereby incorporated by reference.

BACKGROUND OF THE INVENTION

1. Field of the Invention

This invention relates to a solid golf ball which is improved in ball control, feel on hitting, spin receptivity, durability, and flying performance.

2. Prior Art

Because of their impact durability and cut resistance, ionomer resins in the form of ethylene-(meth)acrylic acid copolymers have been widely used and accepted as the cover material for most two-piece golf balls and some wound golf balls. It is, however, said that golf balls with ionomer resin covers are difficult to give a spin as intended when hit by an iron and thus relatively poor in ball control probably because the ionomer resins offer a harder feel on hitting and have higher hardness than balata rubber which is a conventional cover material.

It was thus proposed to use a blend of soft and hard ionomer resins as the golf ball cover as disclosed in U.S. Pat. No. 4,884,814 and JP-A 308577/1989. More particularly, an ionomer resin in the form of an ethylene-(meth)acrylic acid copolymer having a certain spectrum of physical properties is blended with a relatively soft ionomer resin in the form of an ethylene-(meth)acrylic acid-(meth)acrylate terpolymer. While the golf balls using an ionomer resin in the form of an ethylene-(meth)acrylic acid copolymer as the cover suffered from hard hitting feel and difficult ball control, the use of such a blend was effective for achieving significant improvements in these properties.

The golf ball cover of a soft and hard ionomer blend by this proposal, however, has the following problems. The fact that the cover is softer and more receptive to spin on an iron shot indicates an increased frictional force between the club face and the cover. Then balls using a hard core like two-piece golf balls tend to be burred or finely split on the surface since the cover surface can be ablated or scraped by the iron club grooves on an iron shot.

In addition, the ionomer cover itself is low in repulsion due to low hardness, resulting in a substantial loss of ball repulsion.

SUMMARY OF THE INVENTION

Therefore, an object of the present invention is to provide a solid golf ball which is satisfactory in feel on hitting, spin receptivity, ball control, and burring resistance, while maintaining the flying distance inherent to solid golf balls such as two-piece golf balls.

Attempting to produce a solid golf ball which has a soft feel, good spin receptivity, and acceptable repulsion, and is improved in resistance against burring or fine splitting on an iron shot, the inventors have found that as compared with the conventional blend of hard and soft ionomer resins, a blend of a mid-hardness ionomer resin having an intermediate hardness between hard and soft ionomer reins and a soft ionomer resin or a soft ionomer resin alone experiences significantly less surface damage on an iron shot. Balls with a cover which is more resistant against burring on the surface are also satisfactory in feel and spin properties. However, the cover as such is soft and thus low repulsive. It is then difficult to utilize this cover in golf balls. Quite unexpectedly, the above-mentioned requirements can be effectively met by combining the cover with a special core. By blending pentachlorothiophenol or a metal salt thereof in base rubber, a more repulsive core is obtained so that the resulting ball provides a satisfactory level of repulsion.

The present invention provides a golf ball comprising a solid core and a cover enclosing the core. The cover is based on a resin component consisting of (1) 30 to 100% by weight of a first ionomer resin in the form of an ethylene-methacrylic acid-acrylate terpolymer having a flexural modulus of 2,500 to 14,000 psi and a Shore D hardness of 20 to 59 and (2) 70 to 0% by weight of a second ionomer resin in the form of an ethylene-(meth)acrylic acid copolymer having a flexural modulus of 20,000 to 29,000 psi and a Shore D hardness of 56 to 62. The core is preferably made of a rubber composition comprising 100 parts by weight of a base rubber and 0.2 to 1.5 parts by weight of pentachlorothiophenol or a metal salt thereof and has a distortion of 2.3 to 3.3 mm under a load of 100 kg.

DETAILED DESCRIPTION OF THE INVENTION

The golf ball of the present invention has a generally spherical solid core enclosed in a cover. The cover is essentially made of a blend of (1) 30 to 100% by weight, preferably 50 to 90% by weight of a first ionomer resin in the form of an ethylene-methacrylic acid-acrylate terpolymer and (2) 70 to 0% by weight, preferably 50 to 10% by weight of a second ionomer resin in the form of an ethylene-(meth)acrylic acid copolymer.

In the first ionomer resin in the form of an ethylene-methacrylic acid-acrylate terpolymer, the acrylate should preferably have 4 to 12 carbon atoms. Examples of acrylate include methyl acrylate, ethyl acrylate, isobutyl acrylate, n-butyl acrylate and 2-ethylhexyl acrylate. Among them, isobutyl acrylate is preferred. The terpolymer should preferably contain 5 to 15% by weight, preferably 7 to 12% by weight of methacrylic acid, 5 to 45% by weight, preferably 8 to 30% by weight of the acrylate, and the balance of ethylene. With more than 15% by weight of methacrylic acid, a soft cover would not be obtained. With less than 5% by weight of methacrylic acid, repulsion of a golf ball would be lowered. With more than 45% by weight of the acrylate, burring resistance would become inferior because of a too soft cover. With less than 5% by weight of the acrylate, a soft cover would not be obtained. The (meth)acrylic acid in the terpolymer is neutralized with metal ion, preferably zinc ion or sodium ion in an amount of 10 to 90 mol %, preferably 30 to 80 mol % of the (meth)acrylic acid to form an ionomer resin. If the neutralization degree is less than 10 mol %, repulsion of a golf ball would be lowered. If the neutralization degree is more than 90 mol %, the fluidity of a resin composition upon molding would be worsened.

In the second ionomer resin in the form of an ethylene-(meth)acrylic acid copolymer, the content of (meth)acrylic acid should preferably be in the range of 5 to 12% by weight, more preferably 8 to 11% by weight. With more than 12% by weight of (meth)acrylic acid, a soft ionomer resin would not be obtained and thus a soft cover could not be formed. With less than 8% by weight of (meth)acrylic acid, repulsion would be insufficient. The (meth)acrylic acid in the copolymer is neutralized with a metal ion, preferably zinc ion or sodium ion in an amount of 10 to 90 mol %, preferably 30 to 80 mol % of the (meth)acrylic acid. If the neutralization degree is less than 10 mol %, repulsion would be insufficient. If the neutralization degree is more than 90 mol %, the fluidity of a resin composition upon molding would be worsened.

The first ionomer resin in the form of an ethylene-methacrylic acid-acrylate terpolymer has a flexural modulus of 2,500 to 14,000 psi and a Shore D hardness of 20 to 59 and is commercially available in the trade names of Himilan from Du Pont-Mitsui Polychemicals Co., Ltd. and Surlyn from E. I. duPont as shown in Table 1. The second ionomer resin in the form of an ethylene-(meth)acrylic acid copolymer has a flexural modulus of 20,000 to 29,000 psi, preferably 20,000 to 28,500 psi, more preferably 20,000 to 28,000 psi and a Shore D hardness of 52 to 62 and is commercially available in the trade name of Himilan from DUPONT-MITSUI POLYCHEMICALS CO. LTD. as shown in Table 2.

TABLE 1

| | Ion | Flexural modulus (psi) | Shore D hardness |
| --- | --- | --- | --- |
| Himilan 1855 | Zn | 13,000 | 56 |
| Himilan 1856 | Na | 10,100 | 58 |
| Surlyn 8120 | Na | 7,100 | 39 |
| Surlyn 8320 | Na | 2,800 | 25 |

TABLE 2

| | Ion | Flexural modulus (psi) | Shore D hardness |
| --- | --- | --- | --- |
| Himilan 1650 | Zn | 24,700 | 60 |
| Himilan 1652 | Zn | 23,000 | 57 |
| Himilan 1702 | Zn | 21,700 | 62 |

In addition to the resin component, the resin composition for the cover may contain optional additives, for example, dyestuffs, pigments such as titanium dioxide, zinc oxide, and barium sulfate, UV absorbers, anti-oxidants, and dispersing aids such as metal soaps. The ionomer resins and optional additives are mixed in a conventional mixer such as a closed kneader (e.g., Bunbary mixer and kneader) and an extruder and then molded in a conventional manner.

The core is made of a rubber composition comprising a base rubber, a metal salt of an unsaturated carboxylic acid, and a peroxide. Preferably, pentachlorothiophenol or a metal salt thereof is added to the above rubber composition.

The base rubber is preferably cis-1,4-polybutadiene rubber containing at least 90% of cis-configuration because of its high repulsion. Although another rubber component such as natural rubber and polyisoprene rubber may be blended in the cis-1,4-polybutadiene rubber, it is preferred that the base rubber contains at least 80% by weight of the high cis-1,4-polybutadiene rubber. With less than 80% by weight of high cis-1,4-polybutadiene rubber, the base rubber would not take full advantage of the repulsion thereof. The metal salt of an unsaturated carboxylic acid such as acrylic acid and methacrylic acid is blended as a co-crosslinking agent, preferably in an amount of about 25 to 40 parts by weight per 100 parts by weight of the base rubber. Examples of the metal salt of an unsaturated carboxylic acid include zinc salts, magnesium salts and calcium salts of acrylic acid or methacrylic acid. Among them, zinc acrylate is most preferred. The peroxide includes dicumyl peroxide, t-butylperoxybenzoate, di-t-butylperoxide, and 1,1-bis(t-butylperoxy)-3,3,5-trimethyl-cyclohexane. Preferably the peroxide is blended in an amount of about 0.5 to 3 parts, more preferably 0.8 to 2 parts by weight per 100 parts by weight of the base rubber. It is preferable to add pentachlorothiophenol or its salt to the composition for improving repulsion of a golf ball. Pentachlorothiophenol or its salt is blended in an amount of about 0.2 to 1.5 parts by weight per 100 parts by weight of the base rubber in order that this blend system be enhanced in repulsion. Beyond this range, the rubber composition for the core can be retarded in crosslinking reaction. Examples of the salt include zinc salt of pentachlorothiophenol.

If desired, the rubber composition for the core may contain any additive commonly used in the core of two-piece solid golf balls, for example, zinc oxide, anti-oxidant, and barium sulfate. The core rubber composition is mixed in a conventional mixer such as a Bunbary mixer and kneader and then molded and cured into a spherical core by hot pressure vulcanization in a conventional manner. The vulcanized composition or core should have a hardness in a specific range. That is, the distortion of the core under a load of 100 kg should be 2.3 to 3.3 mm. With a distortion of less than 2.3 mm, a ball after enclosure in a cover as defined above is hard and gives an unpleasant hitting feel. With a distortion of more than 3.3 mm, the resulting ball is less repulsive.

The golf ball of the invention is prepared by conventional processes, for example, by molding a solid core from a core material, forming leaf cups from a cover material by a conventional molding technique, and enclosing the core with the leaf cups followed by heat compression molding. Alternatively the solid core is directly covered with a cover material by injection molding.

The thickness of the cover is in the range of 1.4 to 2.5 mm. The diameter of the golf ball is 42.67 mm or more and the weight of the golf ball is 45.93 g or less.

EXAMPLE

Examples of the present invention are given below by way of illustration and not by way of limitation.

A solid core was formed from a rubber composition of the following components.

| Component | Parts by weight |
| --- | --- |
| cis-1,4-polybutadiene rubber (BR01) | 100 |
| zinc acrylate | 33.5 |
| zinc oxide | 10 |
| barium sulfate | 9.6 |
| anti-oxidant | 0.2 |
| dicumyl peroxide | 0.9 |

The solid core was directly covered by injection molding with a cover material consisting of ionomer resin, titanium dioxide for coloring, and dispersing aids, and having a specific gravity of 0.99. The ionomer resins used were Himilan and Surlyn resins having physical properties as shown in Table 3. They were mixed as shown in Table 4. The cover was surface treated and coated with clear lacquer. The resulting two-piece golf balls were measured for weight (g), surface hardness (Shore C and D scales), distortion (mm under a load of 100 kg) and initial speed (m/sec.).

The thickness of the cover was 2.0 mm. The diameter of the golf ball was 42.7 mm and the weight of the golf ball was 45.2 g.

TABLE 3

| Designation | Ion type | MER | Elongation (%) | Flexural modulus (psi) | Shore D hardness |
| --- | --- | --- | --- | --- | --- |
| Himilan 1706 | Zn | 0.7 | 290 | 47,900 | 66 |
| Himilan 1577 | Zn | 5.0 | 410 | 36,300 | 63 |
| Himilan 1650 | Zn | 1.5 | 460 | 24,700 | 60 |
| Himilan 1652 | Zn | 5.0 | 500 | 23,000 | 57 |
| Himilan 1855 | Zn | 1.0 | 510 | 13,000 | 56 |
| Himilan 1856 | Na | 1.0 | 530 | 10,100 | 58 |
| Surlyn 8120 | Na | 0.9 | 660 | 7,100 | 39 |
| Surlyn 8320 | Na | 0.9 | 770 | 2,800 | 25 |
| Surlyn 9970 | Zn | 14.0 | 460 | 28,000 | 62 |

A burring test was carried out on the balls using a robot machine equipped with three pitching wedges, Eagle PW, Rextar HT305 PW and MSX PW commercially available from Bridgestone Sports Co., Ltd. A ball was hit at three different points, once at each point, by each pitching wedge at a head speed of 37 m/s. The three hit points on the ball were visually observed and evaluated in accordance with the following criteria.

○: slight, substantially unnoticeable club face mark
Δ: distinct club face mark, but not feathered on cover surface
×: surface burred and noticeably feathered The results are also shown in Table 4.

TABLE 4

| Cover resin mix | Inventive Cover | | | | | | | | | Comparative Cover | | | | |
| --- | --- | --- | --- | --- | --- | --- | --- | --- | --- | --- | --- | --- | --- | --- |
| | 1 | 2 | 3 | 4 | 5 | 6 | 7 | 8 | 9 | 1 | 2 | 3 | 4 | 5 |
| Himilan 1706 (Zn) | | | | | | | | | | 50 | | 50 | 25 | |
| Himilan 1557 (Zn) | | | | | | | | | | | 50 | | | |
| Surlyn 9970 (Zn) | | | | | | | | 50 | 50 | | | | | |
| Himilan 1650 (Zn) | 50 | 50 | 50 | 25 | | 30 | | | | | | | 75 | 75 |
| Himilan 1652 (Zn) | | | | 25 | 50 | | | | | | | | | |
| Himilan 1702 (Zn) | | | | | | | | | | | | | | |
| Himilan 1855 (Zn) | | | | | | | 50 | | | | | | | |
| Himilan 1856 (Zn) | 50 | | 50 | | | | 50 | 50 | | | | | | |
| Surlyn 8120 (Na) | | 50 | | 50 | 50 | 70 | | | 50 | 50 | 50 | | | 25 |
| Surlyn 8320 (Na) | | | 50 | | | | | | | | | 50 | | |
| Ball properties | | | | | | | | | | | | | | |
| Weight (g) | 45.2 | 45.2 | 45.2 | 45.2 | 45.2 | 45.2 | 45.2 | 45.2 | 45.2 | 45.2 | 45.2 | 45.2 | 45.2 | 45.2 |
| Surface hardness Shore C | | 82 | | 79 | 76 | | | | | | | | | |
| Shore D | 60 | 57 | 49 | 55 | 53 | 51 | 58 | 60 | 58 | 59 | 58 | 53 | 61 | 59 |
| Distortion (mm) | 2.39 | 2.43 | 2.57 | 2.47 | 2.44 | 2.52 | 2.40 | 2.38 | 2.43 | 2.37 | 2.38 | 2.40 | 2.30 | 2.36 |
| Initial speed (m/sec.) | 77.09 | 76.83 | 76.57 | 76.81 | 76.59 | 76.62 | 76.80 | 77.02 | 76.83 | 77.22 | 77.26 | 76.10 | 77.15 | 77.01 |
| Burring test | | | | | | | | | | | | | | |
| Eagle PW | ○ or Δ | ○ | ○ | ○ or Δ | ○ or Δ | ○ | ○ or Δ | ○ | ○ | ○ or Δ | X or Δ | Δ | X | X | Δ |
| Rextar HT305 PW | ○ or Δ | ○ | ○ | ○ or Δ | ○ | ○ | ○ | ○ | ○ or Δ | X or Δ | Δ | X | X | Δ |
| MSX PW | ○ | ○ | ○ | ○ | ○ | ○ | ○ | ○ | ○ or Δ | Δ | Δ or X | Δ or X | Δ |

It is evident from Table 4 that the covers of the present invention are fully resistant against burring by the iron club face.

Next, cores (the diameter 38.7 mm) were molded from the compositions shown in Table 5 and measured for a distortion (mm) under a load of 100 kg and initial speed (m/sec.). The core initial speed was measured using an initial speed meter of the same type as prescribed by golf ball authorized organization R&A (USGA). The results are also shown in Table 5.

TABLE 5

|  | Control Core | Inventive Core | | | | |
| --- | --- | --- | --- | --- | --- | --- |
|  | 1 | 1 | 2 | 3 | 4 | 5 |
| Composition |  |  |  |  |  |  |
| BR01 | 100 | 100 | 100 | 100 | 100 | 100 |
| Zinc acrylate | 33.5 | 33.5 | 33.5 | 33.5 | 33.5 | 33.5 |
| Barium sulfate | 9.6 | 9.6 | 9.6 | 9.6 | 9.6 | 9.6 |
| Zinc oxide | 10 | 10 | 10 | 10 | 10 | 10 |
| Anti-oxidant | 0.2 | 0.2 | 0.2 | 0.2 | 0.2 | 0.2 |
| Lenacit IV* | — | 0.2 | 0.4 | 0.6 | 1.0 | 1.5 |
| Dicumyl peroxide | 0.9 | 0.9 | 0.9 | 0.9 | 0.9 | 0.9 |
| Vulcanizaed core properties |  |  |  |  |  |  |
| Distrotion (mm) | 2.61 | 2.51 | 2.62 | 2.64 | 2.67 | 2.71 |
| Initial speed | 77.75 | 78.14 | 78.29 | 78.35 | 78.64 | 78.54 |

*zinc salt of pentachlorothiophenol commercially available from Bayer Japan Ltd.

It is evident from Table 5 that the cores of the present invention offer an increased initial speed which indicates improved repulsion.

Next, two-piece golf balls were prepared by combining the cover and the core as shown in Table 6. The balls were measured for initial speed by the same procedure as above. The balls were also determined for back spin, stop on the green, and driver flying distance by the following tests. The thickness of the cover was 2.0 mm.

Back Spin

Using a swing robot manufactured by True Temper Co., the ball was hit by an iron (pitching wedge) at a head speed of 37 m/s. The spin quantity was measured by taking a photograph of the ball immediately after impact followed by image analysis.

Stop on the Green

Using the swing robot, the ball was hit by a pitching wedge so as to fly directly on the green. The distance between the landing and stop positions, which was the distance the ball covered due to back spin, was measured.

Flying Distance

Using the swing robot, the ball was hit by a driver W#1 at a head speed of 45 m/s to measure the flying distance.

The results are shown in Table 6.

TABLE 6

|  | Inventive core | | | Comparative | Commercial 2-piece |
| --- | --- | --- | --- | --- | --- |
|  | No. 1 Himilan 1650/ Surlyn 8120 50/50 | No. 4 Himilan 1650/ Surlyn 8120 50/50 | No. 4 Himilan 1855/ Surlyn 1856 50/50 | No. 1 Himilan 1650/ Surlyn 8120 50/50 | golf ball Himilan 1706/ Surlyn 1650 50/50 |
| Cover resin mix |  |  |  |  |  |
| Initial speed (m/s) | 77.08 | 77.30 | 77.27 | 76.85 | 77.10 |
| Back spin (rpm) | 9350 | 9280 | 9310 | 9290 | 8750 |
| Stop on the green (m) | 0.0 | 0.5 | 0.5 | 0.5 | 3.5 |
| Driver flying distance | 225.0 | 224.5 | 225.5 | 220.5 | 225.0 |

As is evident from Table 6, the golf balls of the invention are excellent in ball control and flying performance.

The golf balls of the invention are excellent in spin characteristics, burring resistance, and repulsion.

Although some preferred embodiments have been described, many modifications and variations may be made thereto in the light of the above teachings. It is therefore to be understood that within the scope of the appended claims, the invention may be practiced otherwise than as specifically described.

We claim:

1. A golf ball comprising a solid core and a cover enclosing the core, wherein said cover is based on a resin component consisting of 30 to 90% by weight of a first ionomer resin in the form of an ethylene-methacrylic acid-acrylate terpolymer having a flexural modulus of 10,000 to 14,000 psi and a Shore D hardness of 56 to 59 and 70 to 10% by weight of a second ionomer resin in the form of an ethylene-(meth)acrylic acid copolymer having a flexural modulus of 20,000 to 29,000 psi and a Shore D hardness of 56 to 62.

2. The golf ball of claim 1 wherein said core is made of a rubber composition comprising 100 parts by weight of a base rubber and 0.2 to 1.5 parts by weight of pentachlorothiophenol or a metal salt thereof and has a distortion of 2.3 to 3.3 mm under a load of 100 kg.

3. The golf ball of claim 1 wherein the first ionomer resin is blended in an amount of 50 to 90% by weight and the second ionomer resin is blended in an amount of 50 to 10% by weight.

* * * * *